UNITED STATES PATENT OFFICE 2,029,964

PROCESS FOR PURIFICATION OF POTABLE AND POLLUTED WATERS

Oliver M. Urbain and William R. Stemen, Columbus, Ohio, assignors to Charles H. Lewis, Harpster, Ohio No Drawing. Application April 1, 1935, Serial No. 14,185

2 Claims. (Cl. 210—2)

The process of the present invention relates to the purification of both potable and polluted waters. By potable waters is meant water which is being purified for domestic consumption by the inhabitants of a community.

In the purification of potable water three factors are of prime importance, namely, first, sanitary quality, i. e., content of bacteria, second, tastes and odors, and third, hardness.

The tastes and odors in potable water are due to the presence in the water of organic compounds which have their origin in decomposing organic matter or the passage of industrial wastes into the original watershed. Bacteria, algae, amoeba and many other forms of animal and vegetable life are responsible for the tastes and odors due to the decomposition of organic matter which we find in our potable water supplies. Many public water supplies are also contaminated with phenols. Such is the case in many cities located on the Ohio River and the Great Lakes. Even a few hundredths of 1.0 P. P. M. of phenols will result in a bad taste and odor in the finished water which has been chlorinated. These tastes and odors are due in large part to chlorophenols and chlorocresols.

For the purpose of removing tastes and odors in potable water supplies, activated carbons are now employed. The powdered carbon is added to the water before coagulation, and, after its action is complete, is coagulated from the water with aluminum sulfate and like coagulants. The activated carbons used for this purpose are quite expensive and constitute an important item in the final costs of purification.

The present invention contemplates the use of a material which is not only much less expensive but which also will remove considerably more of the taste and odor producing compounds per unit of weight, and accomplish this result in less time than the activated carbons now employed for the purpose. It is more efficient for the purpose from any angle which may be considered.

In the purification of polluted water as distinguished from potable water, the requirements are quite different. In this case the problem involved is one applied to the removal of organic compounds which are in true solution, and which are responsible for the B. O. D., (biochemical oxygen demand), of a polluted water after the suspended matter and the colloidal matter has been removed. This B. O. D. varies greatly for the different wastes. The B. O. D. of a few representative polluted liquids, after the removal of the suspended and colloidal matter, are given as follows:—

| Waste | 10 day B. O. D. 20° C. |
|---|---|
| | P. P. M. |
| Dilute sewage | 32 |
| Strawboard waste | 370 |
| Tannery waste | 340 |
| Creamery waste | 220 |
| Concentrated sewage | 110 |
| Packing house waste | 2200 |

The elimination of the B. O. D. of the true solution fraction of the various wastes is a problem of considerable magnitude. It is to the solution of this problem in the field of polluted liquids and to the problem of eliminating the tastes and odors from potable water supplies that the present invention is directed.

The material employed in the process consists of etherated chlorinated coal. The constituents of the material that actually do the work are the etherated chlorine derivatives of coal and their derivatives. Therefore, the words "etherated chlorinated coal" as used in this specification and the appended claims are inclusive of the "etherated chlorine derivatives of coal and their derivatives".

In the preparation of the base material we employ powdered coal such as sub-bituminous, bituminous or anthracite coal, powdered to pass through a 5 mesh to 20 mesh screen. The coal is chlorinated at a temperature varying from room temperature to 125° C. by passing chlorine gas through the mass. Above 125° C. the chlorine compounds decompose, so care should be taken to keep the temperature below this critical point. In this chlorination process, catalysts such as iron, iodine, sulfur or lead may to advantage be employed, though their use is not essential. The temperature of the coal mass rises somewhat during chlorination. Hydrochloric acid gas and water vapor are copiously given off. Smaller quantities of carbon oxides, hydrocarbons and chlorinated hydrocarbons are given off.

The product of such chlorination contains substantial amounts of chlorine by weight. The percentage of chlorine depends upon the following factors:—

1—Fineness of the coal
2—Nature or kind of coal
3—Temperature of chlorination
4—Pressure
5—Time of chlorination The finer the coal, the higher the temperature up to 125° C., the higher the pressure, and the longer the time of contact to complete chlorination, the higher will be the percentage of chlorine in the finished product. The chlorinated coal is more porous than the original coal, therefore it has a greater surface exposure. The fragility of the chlorinated coal is not appreciably different from that of the original coal when hard coals are employed. When soft coals are employed, the chlorinated product is much harder than the original coal. The chlorination should be carried out in an apparatus made of materials capable of withstanding the action of hydrochloric acid.

The action of the chlorine on the coal may be expressed by the following factors:

1—Chlorine substitutes for hydrogen in the hydrocarbon part of the so-called coal conglomerate.

2—Chlorine oxidizes certain groupings and opens up the ring structures.

3—Chlorine adds to the unsaturated points in the coal.

4—Chlorine adds to the unsaturated points made under #2.

5—Chlorine renders soluble the inactive inorganic constituents (coal ash) of the coal, such as iron and its compounds, sulfur and the alkaline earth metal compounds, which, upon removal by washing, open up the coal structure, increasing the active surface of the mass.

6—Chlorine activates the surface of the mass by shifting the adsorbed and absorbed gases.

By etherating the chlorinated coal we have been able to materially increase its activity and effectiveness toward certain groups of organic compounds. The etheration of the chlorinated coal may be effected in accordance with several distinct procedures and illustrative methods will now be described.

*Method No. 1.*—In accordance with this method of etherating the chlorinated coal, the latter is caused to react, in the manner described below, with any member or any mixture of members of a group of hydroxy compounds or their substituted derivatives.

The group of hydroxy compounds suitable for use in this method, consist of the following:—

1—Aliphatic alcohols, such as methyl alcohol, propyl alcohol and allyl alcohol.

2—Cyclic alcohols, such as cyclohexanol and cyclopentenol.

3—Aromatic alcohols, such as benzyl alcohol, 2-furancarbinol and phenethyl alcohol.

4—Phenols, such as phenol, cresols and xylenols.

The reaction is effected by heating the chlorinated coal with the selected hydroxy compounds. The heating of the mixtures may be either carried out at atmospheric pressure in a return condenser system, or in a closed system at superatmospheric pressures. The former method is more economical while the latter is more rapid. An alkali metal hydroxide, such as NaOH, or an alkaline earth metal hydroxide, such as $Ca(OH)_2$, in a concentration varying from 1% to 10% of the weight of the chlorinated coal, should be present. A time period varying from 30 minutes to 6 hours is required for complete reaction. After the reaction is complete the etherated product is recovered and water washed.

From our research we are of the opinion that the following reactions take place during the above described etheration of the chlorinated coal. The following symbols have the definitions given:

R—O—H = hydroxy compound.

≡C—Cl = chlorine atom bound to carbon in the chlorinated coal. There are a plurality of such groups in a small mass of chlorinated coal.

M = an alkali hydroxide or an alkaline earth metal hydroxide.

It is to be clearly understood that it is not necessary to replace all the chlorine with ether groups.

The general reaction for the etheration is as follows:

$$\equiv C-Cl + R-O-H + M-O-H \rightarrow \underset{\text{etherated coal}}{\equiv C-O-R} + M-Cl + H_2O$$

Specific examples are as follows:

$$\equiv C-Cl + \underset{\text{methyl alcohol}}{H-O-CH_3} + NaOH \rightarrow \underset{\text{methyl etherated coal}}{\equiv C-O-CH_3} + NaCl + H_2O$$

$$\equiv C-Cl + \underset{\text{benzyl alcohol}}{H-O-CH_2-C_6H_5} + NaOH \rightarrow$$
$$\underset{\text{benzyl etherated coal}}{\equiv C-O-CH_2-C_6H_5} + NaCl + H_2O$$

*Method No. 2.*—In this method of etherating chlorinated coal we employ either of the following, or any mixture of the following:

1. Sodium derivatives of hydroxy compounds.
2. Potassium derivatives of hydroxy compounds.
3. Aluminum derivatives of hydroxy compounds.
4. Magnesium derivatives of hydroxy compounds.
5. Calcium derivatives of hydroxy compounds.
6. Iron derivatives of hydroxy compounds.

The hydroxy compounds, of which we use the derivatives in this method, are those hydroxy compounds specifically listed under Method No. 1.

It is understood that the metal derivatives detailed above are of the type R—O—M, where M = Na, K, Al, Mg, Ca or Fe.

In other words, the metal, M displaces the hydrogen atom of the hydroxy group in the hydroxy compound. The reaction is carried out in a closed system at superatmospheric pressure or at atmospheric pressure in an open system with a return condenser.

The general reaction is as follows:—

$$\equiv C-Cl + M-O-R \longrightarrow \equiv C-O-R + M-Cl$$

Specific examples of the reaction are as follows:—

$$C-Cl + Na-O-C_3H_7 \longrightarrow \underset{\text{propyl etherated coal}}{\equiv C-O-C_3H_7} + NaCl$$

$$2\equiv C-Cl + Ca(O-C_6H_5)_2 \longrightarrow \underset{\text{phenyl etherated coal}}{2\equiv C-O-C_6H_5} + CaCl_2$$

The etherated coal product is water washed.

*Method No. 3.*—In accordance with this third method the chlorinated coal is first hydroxylated. This may be effected by treating the chlorinated coal with an alkali such for example as sodium hydroxide or calcium hydroxide. It being understood that the hydroxides of the alkali metals and alkaline earth metals are suitable for this purpose. The hydroxylation may be carried out at temperatures up to 100° C. The reactions, of course, proceed faster at the higher temperature.

The hydroxylation of the chlorinated coal may also be effected to lesser degree by the action of steam or water. In either event, the hydroxylation is believed to be a result of the hydrolysis or saponification, or both, of the chlorinated coal.

The hydroxylated coal is next treated with an ester of either of the following acids:
1—Sulfuric acid
2—Phosphoric acid
3—Sulfonic acid The procedure is to add a solution (5% to 35%) of an alkali metal hydroxide, or a solution of an alkaline earth metal hydroxide to the hydroxylated chlorinated coal which may be done in any suitable tank equipped with an agitator. The ester is then added and the mixture heated either at atmospheric pressure in a return condenser system, or at superatmospheric pressure in a closed system as described under Method Number 1 above. The mass should be kept in constant agitation. After the reaction is complete the etherated coal is recovered and water washed. The following reactions show the actions involved in this third method:

The R of the esters is the hydrocarbon residue of the hydroxy compounds given under Method No. 1.

The general reaction is as follows:—

$\equiv C-O-H=$ the hydroxyl group bound to carbon in the hydroxylated coal. There are a plurality of such groups in a small mass of the hydroxylated chlorinated coal.

$R'=$ hydrocarbon residue of sulfonic acid.

$$2\equiv C-O-H + R_2SO_4 \longrightarrow 2\equiv C-O-R + H_2SO_4 \text{ sulfuric acid}$$

$$3\equiv C-O-H + R_3PO_4 \longrightarrow 3\equiv C-O-R + H_3PO_4 \text{ phosphoric acid}$$

$$\equiv C-O-H + R'-SO_3-R \longrightarrow \equiv C-O-R + R'-SO_3-H \text{ sulfonic acid}$$

In all of these reactions the acid formed, as shown on the right of the reactions, is neutralized by the alkali present. The quantity of alkali to employ in this method may be computed from the above reactions.

Specific examples, employing the three classes of esters, are given as follows:

$$2\equiv C-O-H + (C_6H_5)_2SO_4 \rightarrow 2\equiv C.O.C_6H_5 + H_2SO_4$$
phenyl sulfate → etherated coal + sulfuric acid $$3\equiv C-O-H + (CH_3)_3PO_4 \rightarrow 3\equiv C-O-CH_3 + H_3PO_4$$
methyl phosphate → etherated coal + phosphoric acid $$\equiv C-O-H + C_7H_7-SO_3-C_2H_5 \rightarrow \equiv C-O-C_2H_5 + C_7H_7-SO_3-H$$
ethyl toluenesulfonate → etherated coal + toluenesulfonic acid The ethereated chlorinated coal product obtained in accordance with any one of the three above described methods is suitable for our process.

In the treatment of water, the mode of application may be by a filter arrangement or by adding the material in a finely powdered condition directly to the water to be treated, followed by adequate agitation and subsequent coagulation. If used as a filter, the particle size of the material should be from 5 mesh to 10 mesh; if added directly to the water the fineness may be such that the particle will pass through a 40 mesh screen.

By using etherated chlorinated coal as a filter material, one not only obtains a splendid mechanical filter but an extremely active chemical filter as well.

The mechanism of the removal of the organic compounds by etherated chlorinated coal, are as follows:—
1—Sorption.
2—Metathesis.
3—Addition (chemical).

When used as a filter a time period of contact of approximately 20 minutes will be found adequate. The filter may constitute the last step in a complete purification treatment. The size of the filter is of no importance so long as a suitable time period of contact is provided for.

When used in the powdered form, the etherated chlorinated coal is added just ahead of the coagulation step and given approximately 15 minutes of agitation. When used in potable water purification, the etherated chlorinated coal is added before or during the coagulation step and agitated for about fifteen (15) minutes.

We have effectively removed tastes and odors from potable water and also substantially eliminated the B. O. D. of the true solution fraction of organic matter present in a polluted water by treatment with etherated chlorinated coal in accordance with the described process.

The regeneration of the material may be effected by treatment with steam, or steam and hot water, or hot water alone, or a back wash with an inorganic acid, such as hydrochloric or sulfuric acid, or a back wash with a solution of an alkali metal hydroxide, or an alkaline earth metal hydroxide in either a hot or cold solution.

Having thus described our invention, what we claim is:—

1. In a process for the treatment of potable and polluted waters, the step of subjecting the water to the action of etherated chlorinated coal.

2. In a process for the treatment of potable and polluted waters, the step of subjecting the water to the action of etherated chlorinated derivatives of coal.

OLIVER M. URBAIN.
WILLIAM R. STEMEN.